United States Patent
Yokokawa et al.

(10) Patent No.: US 8,300,969 B2
(45) Date of Patent: Oct. 30, 2012

(54) IMAGE PROCESSING APPARATUS AND METHOD, AND PROGRAM

(75) Inventors: Masatoshi Yokokawa, Tokyo (JP); Jun Murayama, Tokyo (JP); Kazuki Aisaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 12/336,477

(22) Filed: Dec. 16, 2008

(65) Prior Publication Data
US 2009/0214121 A1 Aug. 27, 2009

(30) Foreign Application Priority Data
Dec. 18, 2007 (JP) .................................. 2007-325511

(51) Int. Cl.
*G06K 9/40* (2006.01)
(52) U.S. Cl. ........................ 382/255; 382/266
(58) Field of Classification Search ......................... None
See application file for complete search history.

(56) References Cited

U.S. PATENT DOCUMENTS

2005/0249397 A1* 11/2005 Ichikawa et al. .............. 382/151
2008/0013861 A1* 1/2008 Li et al. ......................... 382/286
2008/0279470 A1* 11/2008 Warmuth et al. .............. 382/255
2009/0079862 A1* 3/2009 Subbotin ........................ 348/345

OTHER PUBLICATIONS

Hanghang Tong et al., "blur Detection for Digital Images Using Wavelet Transform", Microsoft Research Asia.

* cited by examiner

*Primary Examiner* — Jason M Repko
*Assistant Examiner* — David F Dunphy
(74) *Attorney, Agent, or Firm* — Finnegan, Henderson, Farabow, Garrett & Dunner, L.L.P.

(57) ABSTRACT

An edge map creation unit detects an edge intensity of an input image in units of three types of blocks having different sizes. An operation parameter adjustment unit sets initial values of an edge reference value and an extraction reference value on the basis of a dynamic range which is a difference between the maximum and minimum values of the edge intensity. An edge point extraction unit extracts an edge point from the input image on the basis of the edge reference value. Until an extraction amount determination unit determines that the edge point extraction amount is appropriate on the basis of the extraction reference value, the operation parameter adjustment unit repeatedly performs a processing of adjusting the edge reference value, and the edge point extraction unit repeatedly performs a processing of extracting the edge point from the input image on the basis of the adjusted edge reference value.

10 Claims, 9 Drawing Sheets

IMAGE PROCESSING APPARATUS AND METHOD, AND PROGRAM

CROSS REFERENCES TO RELATED APPLICATIONS

The present invention contains subject matter related to Japanese Patent Application JP 2007-325511 filed in the Japanese Patent Office on Dec. 18, 2007, the entire contents of which are incorporated herein by reference.

BACKGROUND OF THE INVENTION

1. Field of the Invention

The present invention relates to an image processing apparatus and method, and a program, and more specifically, the invention relates to an image processing apparatus and method for detecting a blur state of an image, and a program.

2. Description of the Related Art

Up to now, such a method has been proposed that by using a wavelet transform, a pixel constituting an edge in an image (hereinafter, referred to as edge point) is extracted, and a type of the extracted edge point is analyzed, so that a blur degree which is an index indicating a blur state of the image is detected (for example, refer to Hanghang Tong, Mingjing Li, Hongjiang zhang, Changshui Zhang, "Blur Detection for Digital Images Using Wavelet Transform", Multimedia and Expo, 2004. ICME '04. 2004 IEEE International Conference on, 27-30 Jun. 2004, page(s) 17-20).

SUMMARY OF THE INVENTION

Incidentally, the amount of the edge included in the image largely varies depending on a type of a subject such as scenery or a human face (hereinafter, also referred to as edge amount). For example, the edge amount is large in an image such as an artificial pattern or an architectural structure which includes much texture, and the edge amount is small in an image such as natural scenery or a human face which includes not much texture.

However, according to an invention disclosed in "Blur Detection for Digital Images Using Wavelet Transform", as the edge point is regularly extracted by using fixed parameters and the blur degree is detected by analyzing the extracted edge point, depending on the edge amount included in the image, a fluctuation in a detection accuracy for the blur degree is generated. For example, regarding the image with the small edge amount which includes not much texture, it is difficult to extract the sufficient amount of the edge point, and as a result, there is a tendency that the detection accuracy for the blur degree is decreased.

The present invention has been made in view of the above-mentioned situation, and it is desirable to enable the detection for the blur state of the image at a higher accuracy.

According to an embodiment of the present invention, there is provided an image processing apparatus configured to extract an edge point which is a pixel constituting an edge in an image, perform an analysis as to whether or not a blur is generated in the extracted edge point, and detect a blur state of the image on the basis of the analysis result, the image processing apparatus including: edge intensity detection means adapted to detect an intensity of the edge of the image in units of a block of a predetermined size; parameter adjustment means adapted to adjust an edge reference value used for a determination as to whether or not this is the edge point and an extraction reference value used for a determination as to whether or not an extraction amount of the edge point is appropriate, and also set initial values of the edge reference value and the extraction reference value as larger values as a dynamic range which is a difference between a maximum value and a minimum value of the edge intensity of the image is larger; edge point extraction means adapted to extract as the edge point a pixel in an edge block which is a block where the detected edge intensity is equal to or larger than the edge reference value; and extraction amount determination means adapted to determine whether or not the extraction amount of the edge point is appropriate through a comparison with the extraction reference value, in which the parameter adjustment means repeatedly performs a processing of adjusting the edge reference value in a direction in which the extraction amount of the edge point becomes appropriate until it is determined that the extraction amount of the edge point is appropriate, and the edge point extraction means repeatedly performs a processing of extracting the edge point used for the detection of the blur state of the image on the basis of the edge reference value adjusted by the parameter adjustment means until it is determined that the extraction amount of the edge point is appropriate.

In the image processing apparatus according to the embodiment of the present invention, the edge intensity detection means can detect the edge intensity of the image on the basis of a difference value of pixel values between the pixels in the block.

In the image processing apparatus according to the embodiment of the present invention, the edge intensity detection means can detect the edge intensity of the image in units of a plurality of blocks having different sizes, and the edge point extraction means can extract the pixel included in at least one edge block as the edge point.

In the image processing apparatus according to the embodiment of the present invention, the edge intensity detection means can detect the edge intensity of the image in units of a block of a first size, further detect the edge intensity of the image in units of a block of a second size which is different from the first size by detecting an edge intensity of a first averaged image which is composed of a mean value of the pixels in the respective blocks obtained by dividing the image into the blocks of the first size in units of the block of the first size, and further detect the edge intensity of the image in units of a block of a third size which is different from the first size and the second size by detecting an edge intensity of a second averaged image which is composed of a mean value of the pixels in the respective blocks obtained by dividing the first averaged image into the blocks of the first size in units of the block of the first size.

According to an embodiment of the present invention, there is provided an image processing method for an image processing apparatus configured to extract an edge point which is a pixel constituting an edge in an image, perform an analysis as to whether or not a blur is generated in the extracted edge point, and detect a blur state of the image on the basis of the analysis result, the image processing method including the steps of: detecting an intensity of the edge of the image in units of a block of a predetermined size; setting initial values of an edge reference value used for a determination as to whether or not this is the edge point and an extraction reference value used for a determination as to whether or not an extraction amount of the edge point is appropriate as larger values as a dynamic range which is a difference between a maximum value and a minimum value of the edge intensity of the image is larger; extracting as the edge point a pixel in an edge block which is a block where the detected edge intensity is equal to or larger than the edge reference value; determining whether or not the extraction amount of the edge point is appropriate through a comparison with the extraction reference value; and repeating, until it is determined that the extraction amount of the edge point is appropriate, a processing of adjusting the edge reference value in a direction in which the extraction amount of the edge point becomes appropriate, and a processing of extracting the edge point used for the detection of the blur state of the image on the basis of the adjusted edge reference value.

According to an embodiment of the present invention, there is provided a program instructing a computer to execute a processing of extracting an edge point which is a pixel constituting an edge in an image, performing an analysis as to whether or not a blur is generated in the extracted edge point, and detecting a blur state of the image on the basis of the analysis result, the program instructing the computer to execute a processing including the steps of: detecting an intensity of the edge of the image in units of a block of a predetermined size; setting initial values of an edge reference value used for a determination as to whether or not this is the edge point and an extraction reference value used for a determination as to whether or not an extraction amount of the edge point is appropriate as larger values as a dynamic range which is a difference between a maximum value and a minimum value of the edge intensity of the image is larger; extracting as the edge point a pixel in an edge block which is a block where the detected edge intensity is equal to or larger than the edge reference value; determining whether or not the extraction amount of the edge point is appropriate through a comparison with the extraction reference value; and repeating, until it is determined that the extraction amount of the edge point is appropriate, a processing of adjusting the edge reference value in a direction in which the extraction amount of the edge point becomes appropriate, and a processing of extracting the edge point used for the detection of the blur state of the image on the basis of the adjusted edge reference value.

According to the embodiment of the present invention, the intensity of the edge of the image is detected in units of the block of the predetermined size, the initial values of the edge reference value used for the determination as to whether or not this is the edge point and the extraction reference value used for the determination as to whether or not the extraction amount of the edge point is appropriate are set as the larger values as the dynamic range which is the difference between the maximum value and the minimum value of the edge intensity of the image is larger, the pixel in the edge block which is the block where the detected edge intensity is equal to or larger than the edge reference value is extracted as the edge point, it is determined whether or not the extraction amount of the edge point is appropriate through the comparison with the extraction reference value, and until it is determined that the extraction amount of the edge point is appropriate, the processing of adjusting the edge reference value in the direction in which the extraction amount of the edge point becomes appropriate and the processing of extracting the edge point used for the detection of the blur state of the image on the basis of the adjusted edge reference value are repeatedly performed.

According to the embodiment of the present invention, the blur state of the image can be detected. In particular, according to the embodiment of the present invention, the blur state of the image can be detected at a higher accuracy.

DESCRIPTION OF THE PREFERRED EMBODIMENTS

Hereinafter, embodiments to which the present invention is applied will be described with reference to the drawings.

Figure 1:
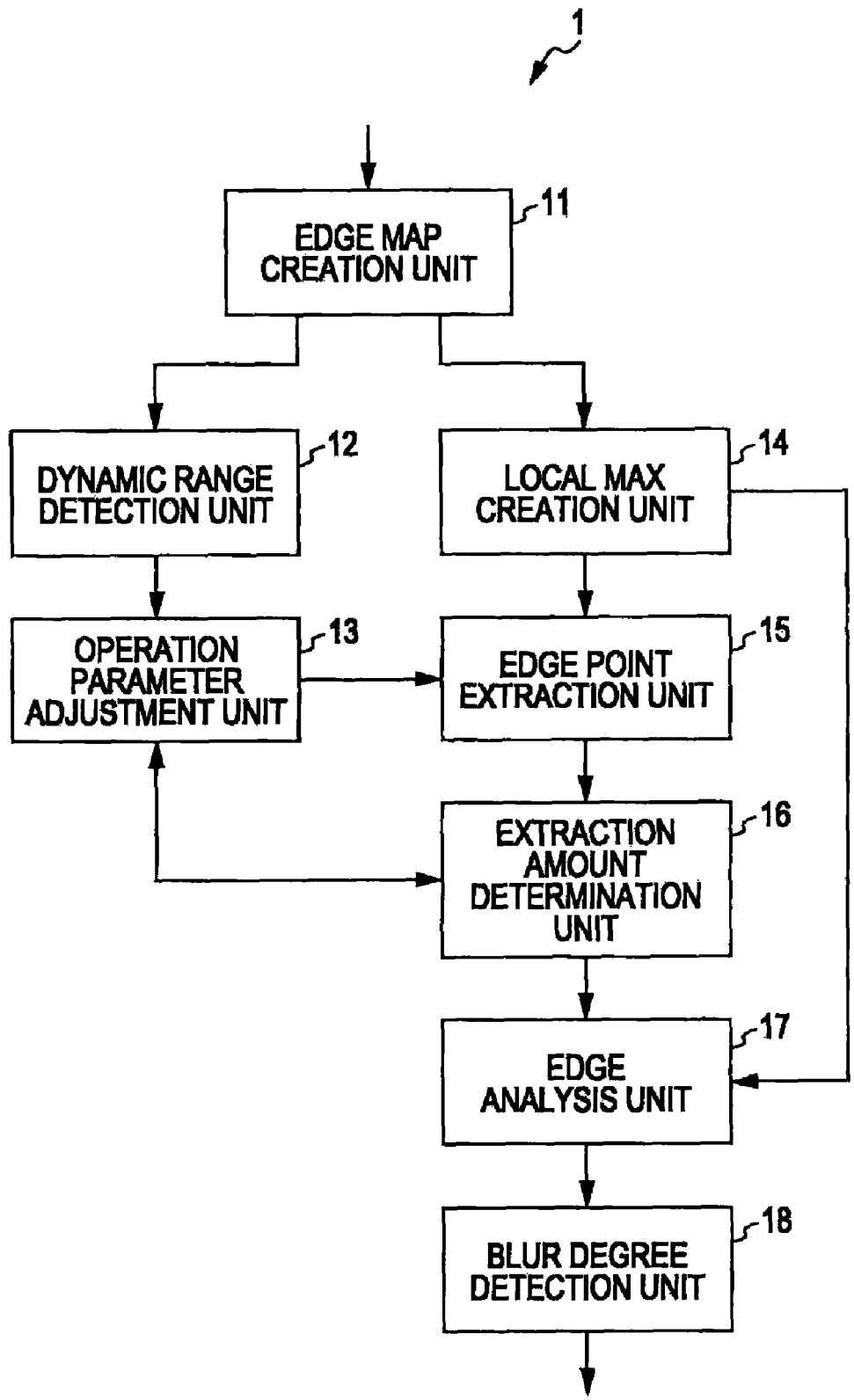
FIG. 1 is a block diagram of an image processing apparatus according to an embodiment to which the present invention is applied.

FIG. 1 is a block diagram of an image processing apparatus according to an embodiment to which the present invention is applied. An image processing apparatus 1 in FIG. 1 analyzes as to whether or not a blur is generated in an edge point in an image which is input (hereinafter, referred to as input image), and on the basis of the analysis result, a blur state of the input image is detected. The image processing apparatus 1 is composed by including an edge map creation unit 11, a dynamic range detection unit 12, an operation parameter adjustment unit 13, a local max creation unit 14, an edge point extraction unit 15, an extraction amount determination unit 16, an edge analysis unit 17, and a blur degree detection unit 18.

Figure 2:
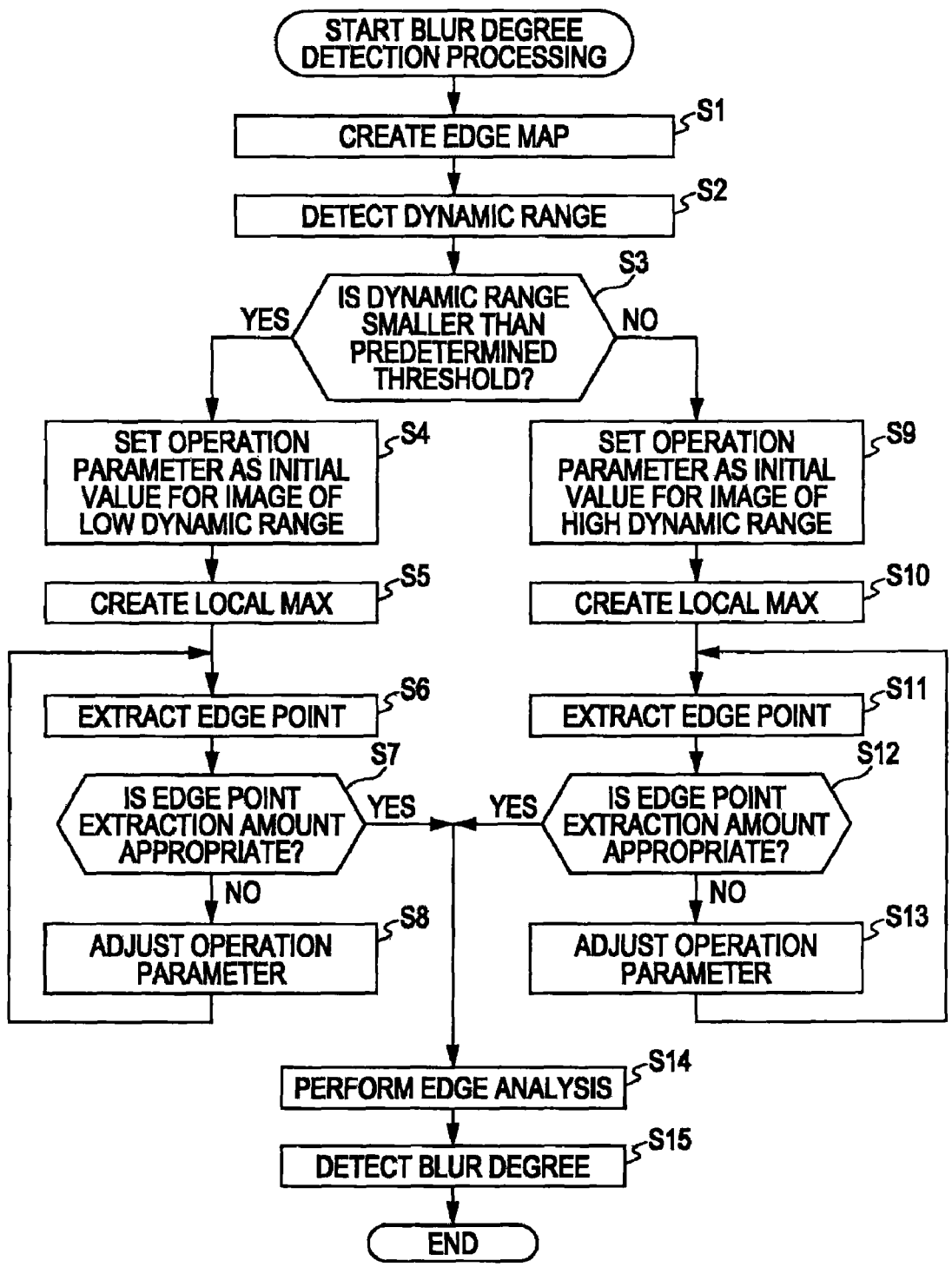
FIG. 2 is a flowchart for describing a blur degree detection processing executed by the image processing apparatus.

The edge map creation unit 11 detects an intensity of the edge of the input image (hereinafter, referred to as edge intensity) in units of three types of blocks having the different sizes of scales 1 to 3, and creates edge maps of the scales 1 to 3 (hereinafter, referred to as edge maps 1 to 3) in which the detected edge intensity is set as the pixel value as will be described below with reference to FIG. 2. The edge map creation unit 11 supplies the created edge maps 1 to 3 to the dynamic range detection unit 12 and the local max creation unit 14.

The dynamic range detection unit 12 detects a dynamic range which is a difference between the maximum value and the minimum value of the edge intensity of the input image and supplies information representing the detected dynamic range to the operation parameter adjustment unit 13 as will be described below with reference to FIG. 2.

On the basis of the detected dynamic range, the operation parameter adjustment unit 13 adjusts an operation parameter used for extraction of the edge point so that the extraction amount of the edge point used for detection for the blur state of the input image (hereinafter, also referred to as edge point extraction amount) becomes an appropriate value as will be described below with reference to FIG. 2. The operation parameters include an edge reference value used for determination as to whether or not this is the edge point and an extraction reference value used for determination as to whether or not the edge point extraction amount is appropriate. The operation parameter adjustment unit 13 supplies information representing the set edge reference value to the edge point extraction unit 15 and the extraction amount determination unit 16, and supplies information representing the set extraction reference value to the extraction amount determination unit 16.

The local max creation unit 14 divides the edge maps 1 to 3 into respective blocks having predetermined sizes, and creates local maxes of the scales 1 to 3 (hereinafter, referred to as local maxes 1 to 3) by extracting a maximum value of the pixel value in each block as will be described below with reference to FIG. 2. The local max creation unit 14 supplies the created local maxes 1 to 3 to the edge point extraction unit 15 and the edge analysis unit 17.

On the basis of the edge reference value and the local maxes 1 to 3, the edge point extraction unit 15 extracts the edge points from the input image, and creates edge point tables of the scales 1 to 3 representing information of the extracted edge points (hereinafter, referred to as the edge point tables 1 to 3) to be supplied to the extraction amount determination unit 16 as will be described below with reference to FIG. 2.

On the basis of the edge point tables 1 to 3 and the extraction reference value, the extraction amount determination unit 16 determines whether or not the edge point extraction amount is appropriate as will be described below with reference to FIG. 2. The extraction amount determination unit 16 notifies the operation parameter adjustment unit 13 that the edge point extraction amount is not appropriate in a case where it is determined that the edge point extraction amount is not appropriate, and supplies the edge reference value at that time and the edge point tables 1 to 3 to the edge analysis unit 17 in a case where it is determined that the edge point extraction amount is appropriate.

As will be described below with reference to FIG. 2, the edge analysis unit 17 performs analysis of the extracted edge points and supplies information representing the analysis result to the blur degree detection unit 18.

On the basis of the analysis result of the edge point, the blur degree detection unit 18 detects a blur degree which is an index for the blur state of the input image as will be described below with reference to FIG. 2. The blur degree detection unit 18 outputs information representing the detected blur degree to the outside.

Next, with reference to a flowchart of FIG. 2, a blur detection processing executed by the image processing apparatus 1 will be described. It should be noted that this processing is started, for example, when the input image which is a detection target is input to the edge map creation unit 11.

In step S1, the edge map creation unit 11 creates the edge map. To be more specific, the edge map creation unit 11 divides the input image into blocks having the size of 2×2 pixels, and on the basis of the following Expressions (1) to (6), calculates absolute values $M_{TL\_TR}$ to $M_{BL\_BR}$ which are differences of the pixel values between the pixels in the respective blocks.

[Expression 1]

$$M_{TL\_TR} = |a-b| \quad (1)$$

$$M_{TL\_BL} = |a-c| \quad (2)$$

$$M_{TL\_BR} = |a-d| \quad (3)$$

$$M_{TR\_BL} = |b-c| \quad (4)$$

$$M_{TR\_BR} = |b-d| \quad (5)$$

$$M_{BL\_BR} = |c-d| \quad (6)$$

Figure 3:
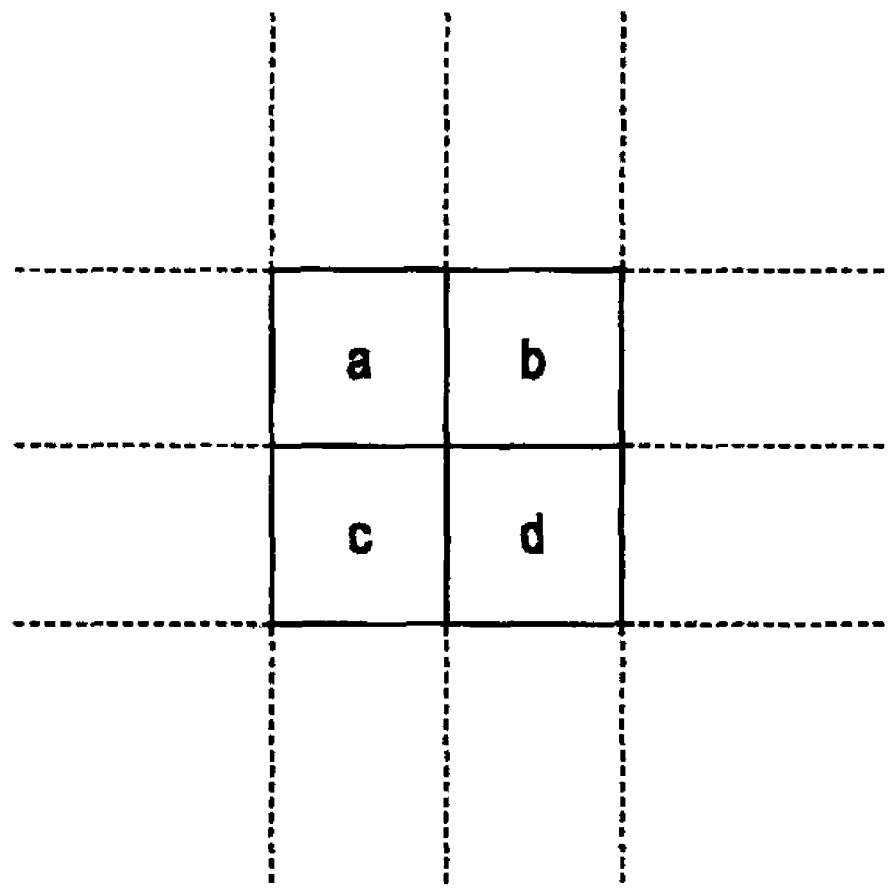
FIG. 3 is a drawing for describing an edge map creation processing.

It should be noted that in Expressions (1) to (6), as illustrated in FIG. 3, a pixel value a denotes a pixel value of the pixel on the upper left in the block, a pixel value b denotes a pixel value of the pixel on the upper right in the block, a pixel value c denotes a pixel value of the pixel on the lower left in the block, and a pixel value d denotes a pixel value of the pixel on the lower right in the block.

Next, on the basis of the following Expression (7), the edge map creation unit 11 calculates of a mean value $M_{Ave}$ the difference absolute values $M_{TL\_TR}$ to $M_{BL\_BR}$.

[Expression 2]

$$M_{Ave} = \frac{M_{TL\_TR} + M_{TL\_BL} + M_{TL\_BR} + M_{TR\_BL} + M_{TR\_BR} + M_{BL\_BR}}{6} \quad (7)$$

That is, the mean value $M_{Ave}$ denotes a mean value of the edge intensities in the upper and lower, left and right, and oblique directions in the block.

The edge map creation unit 11 creates the edge map 1 by arranging the calculated mean value $M_{Ave}$ in the same order as the corresponding block.

Furthermore, in order to create the edge map 2 and the edge map 3, the edge map creation unit 11 creates averaged images of scales 2 and 3 on the basis of the following Expression (8).

[Expression 3]

$$P^{i+1}_{(m,n)} = \frac{P^i_{(2m,2n)} + P^i_{(2m,2n+1)} + P^i_{(2m+1,2n)} + P^i_{(2m+1,2n+1)}}{4} \quad (8)$$

It should be noted that in Expression (8), $P^i(x, y)$ represents a pixel value for a coordinate (x, y) of an averaged image of a scale i, and $P^{i+1}(x, y)$ represents a pixel value for a coordinate (x, y) of an averaged image of a scale i+1. It should be noted that the averaged image of the scale 1 is an input image. That is, the averaged image of the scale 2 is an image composed of a mean value of the pixel values of the respective blocks obtained by dividing the input image into blocks of the size of 2×2 pixels, and the averaged image of the scale 3 is an image composed of a mean value of the pixel values of the respective blocks obtained by dividing the averaged image of the scale 2 into blocks of the size of 2×2 pixels.

The edge map creation unit 11 performs a similar processing on the averaged images of the scale 2 and the scale 3 to that performed on the input image by respectively using Expressions (1) to (7), and creates the edge map 2 and the edge map 3.

Therefore, the edge maps 1 to 3 are images in which edge components in mutually different frequency bands of the scales 1 to 3 are extracted from the input image. It should be noted that the number of pixels in the edge map 1 is ¼ (½ long×½ width) of the input image, the number of pixels in the edge map 2 is 1/16 (¼ long×¼ width) of the input image, and the number of pixels in the edge map 3 is 1/64 (⅛ long×⅛ width) of the input image.

The edge map creation unit 11 supplies the created edge maps 1 to 3 to the dynamic range detection unit 12 and the local max creation unit 14.

In step S2, the dynamic range detection unit 12 detects the dynamic range. To be more specific, the dynamic range detection unit 12 detects the maximum value and the minimum value of the pixel values among the edge maps 1 to 3, and detects a value obtained by subtracting the detected minimum value from the maximum value of the pixel values, that is, a difference between the maximum value and the minimum value of the edge intensity of the input image, as the dynamic range. The dynamic range detection unit 12 supplies the information representing the detected dynamic range to the operation parameter adjustment unit 13.

It should be noted that other than the above-mentioned method, for example, it is also conceivable that the dynamic range is detected for each edge map, and the maximum value, the mean value, or the like of the detected dynamic range is adopted as the actually used dynamic range.

In step S3, the operation parameter adjustment unit 13 determines whether the dynamic range is smaller than a predetermined threshold. In a case where it is determined that the dynamic range is smaller than the predetermined threshold, that is, this is a low dynamic range, the processing is advanced to step S4.

In step S4, the operation parameter adjustment unit 13 sets the operation parameters as an initial value for the image of the low dynamic range. To be more specific, it is estimated that the image of the low dynamic range has less edge as compared with an image of a high dynamic range, and the amount of the extracted edge point is small. Therefore, so as to be able to extract the sufficient amount of edge point to set the detection accuracy for the blur degree of the input image at equal to or higher than a certain level, an initial value of the edge reference value for the image of the low dynamic range is set as a smaller value than an initial value of the edge reference value for the image of the high dynamic range. Also, an initial value of the extraction reference value for the image of the low dynamic range is set as a smaller value than an initial value of the extraction reference value for the image of the high dynamic range. The operation parameter adjustment unit 13 supplies the information representing the set edge reference value to the edge point extraction unit 15 and the extraction amount determination unit 16, and supplies the information representing the set extraction reference value to the extraction amount determination unit 16.

Figure 4:
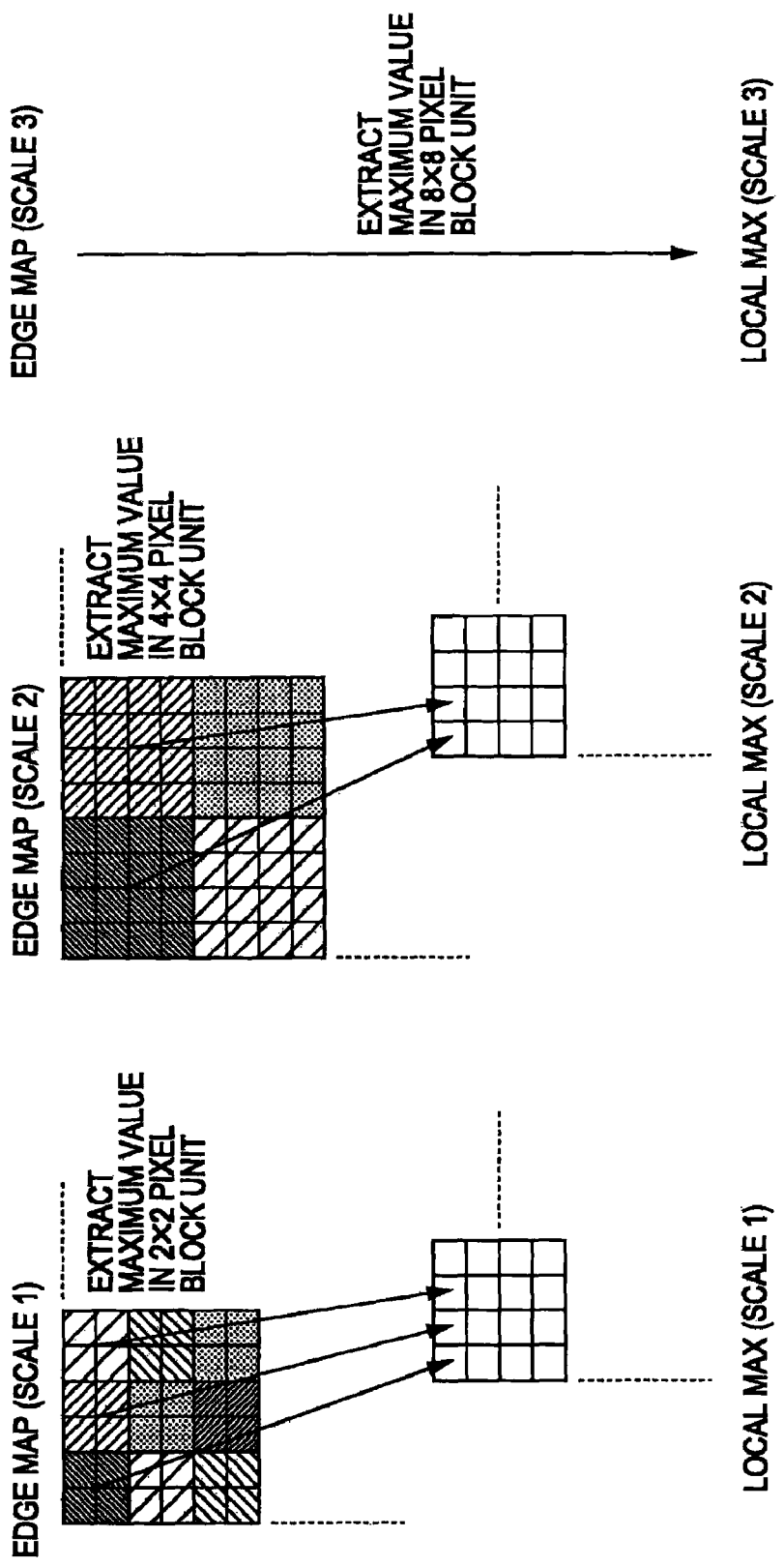
FIG. 4 is a drawing for describing a local max creation processing.

In step S5, the local max creation unit 14 creates the local max. To be more specific, as illustrated in the left side of FIG. 4, the local max creation unit 14 divides the edge map 1 into blocks of 2×2 pixels, extracts the maximum value of each block, and arranges the extracted maximum values in the same order as the corresponding blocks to create the local max 1. Also, as illustrated in the center of FIG. 4, the local max creation unit 14 divides the edge map 2 into blocks of 4×4 pixels, extracts the maximum value of each block, and arranges the extracted maximum values in the same order as the corresponding blocks to create the local max 2. Furthermore, as illustrated in the right side of FIG. 4, the local max creation unit 14 divides the edge map 3 into blocks of 8×8 pixels, extracts the maximum value of each block, and arranges the extracted maximum values in the same order as the corresponding blocks to create the local max 3. The local max creation unit 14 supplies the created local maxes 1 to 3 to the edge point extraction unit 15 and the edge analysis unit 17.

In step S6, the edge point extraction unit 15 extracts the edge point. To be more specific, in a case where the edge point extraction unit 15 selects one target pixel in the input image and the selected coordinate of the target pixel is set as (x, y), the coordinate of the pixel of the local max 1 $(x_1, y_1)$ corresponding to the target pixel is calculated on the basis of the following Expression (9).

$$(x_1, y_1) = (x/4, y/4) \tag{9}$$

Where, cutoff after the decimal point.

That is, one pixel of the local max 1 is generated from a block of 4×4 pixels of the input image, and therefore the coordinate of the pixel of the local max 1 corresponding to the target pixel of the input image takes ¼ of the values of the x coordinate and the y coordinate of the target pixel.

Similarly, the edge point extraction unit 15 calculates the coordinate of the pixel of the local max 2 $(x_2, y_2)$ corresponding to the target pixel and the coordinate of the pixel of the local max 3 $(x_3, y_3)$ corresponding to the target pixel on the basis of the following Expression (10) and Expression (11).

$$(x_2, y_2) = (x/16, y/16) \tag{10}$$

$$(x_3, y_3) = (x/64, y/64) \tag{11}$$

Where, cutoff after the decimal point.

In a case where the pixel value of the coordinate of the local max 1 $(x_1, y_1)$ is equal to or higher than the edge reference value, the edge point extraction unit 15 extracts the target pixel as the edge point in the local max 1, and stores the coordinate of the target pixel (x, y) and the pixel value of the coordinate of the local max 1 $(x_1, y_1)$ while being associated with each other. Similarly, in a case where the pixel value of the coordinate of the local max 2 $(x_2, y_2)$ is equal to or larger than the edge reference value, the edge point extraction unit 15 extracts the target pixel as the edge point in the local max 2, and stores the coordinate of the target pixel (x, y) and the pixel value of the coordinate of the local max 2 $(x_2, y_2)$ while being associated with each other, and in a case where the pixel value of the coordinate of the local max 3 $(x_3, y_3)$ is equal to or larger than the edge reference value, extracts the target pixel as the edge point in the local max 3, and stores the coordinate of the target pixel (x, y) and the pixel value of the coordinate of the local max 3 $(x_3, y_3)$ while being associated with each other.

The edge point extraction unit 15 repeatedly performs the above-mentioned processing until all the pixels of the input image become target pixels, extracts the pixel included in the block where the edge intensity is equal to or larger than the edge reference value among the blocks of 4×4 pixels of the input image as the edge point on the basis of the local max 1, extracts the pixel included in the block where the edge intensity is equal to or larger than the edge reference value among the blocks of 16×16 pixels of the input image as the edge point on the basis of the local max 2, and extracts the pixel included in the block where the edge intensity is equal to or larger than the edge reference value among the blocks of 64×64 pixels of the input image as the edge point on the basis of the local max 3. Therefore, the pixel included in at least one of the blocks of 4×4 pixels, 16×16 pixels, or 64×64 pixels of the input image where the edge intensity is equal to or larger than the edge reference value is extracted as the edge point.

The edge point extraction unit 15 create the edge point table 1 which is a table where the coordinate (x, y) of the edge point extracted on the basis of the local max 1 is associated with the pixel value of the pixel of the local max 1 corresponding to the edge point, the edge point table 2 which is a table where the coordinate (x, y) of the edge point extracted on the basis of the local max 2 is associated with the pixel value of the pixel of the local max 2 corresponding to the edge point, and the edge point table 3 which is a table where the coordinate (x, y) of the edge point extracted on the basis of the local max 3 s associated with the pixel value of the pixel of the local max 3 corresponding to the edge point to be supplied to the extraction amount determination unit 16.

In step S7, the extraction amount determination unit 16 determines whether the edge point extraction amount is appropriate. The extraction amount determination unit 16 compares the total number of extracted edge points, that is, the total of data pieces of the edge point tables 1 to 3 with the extraction reference value, and determines that the edge point extraction amount is not appropriate in a case where the total number is smaller than the extraction reference value, and the processing is advanced to step S8.

In step S8, the operation parameter adjustment unit 13 adjusts the operation parameters. To be more specific, the extraction amount determination unit 16 notifies the operation parameter adjustment unit 13 that the edge point extraction amount is not appropriate. The operation parameter adjustment unit 13 sets the edge reference value smaller by a predetermined value so that more edge points are to be extracted than the current number. The operation parameter adjustment unit 13 supplies information representing the adjusted edge reference value to the edge point extraction unit 15 and the extraction amount determination unit 16.

After that, the processing is returned to step S6, and until it is determined in step S7 that the edge point extraction amount is appropriate, the processing in steps S6 to S8 is repeatedly executed. That is, until the edge point extraction amount becomes an appropriate value, the edge point is extracted while the edge reference value is adjusted, and the processing of creating the edge point tables 1 to 3 is repeatedly performed.

On the other hand, in step S7, in a case where the total number of extracted edge points is equal to or larger than the extraction reference value, the extraction amount determination unit 16 determines that the edge point extraction amount is appropriate, and the processing is advanced to step S14.

Also, in step S3, in a case where it is determined that the dynamic range is equal to or larger than the predetermined threshold, that is, this is the high dynamic range, the processing is advanced to step S9.

In step S9, the operation parameter adjustment unit 13 sets the operation parameters as the initial value for the image of the high dynamic range. To be more specific, the image of the high dynamic range has more edge as compared with the image of the low dynamic range, and it is estimated that the amount of extracted edge points is large. Therefore, in order to improve the detection accuracy for the blur degree of the input image as much as possible, the initial value of the edge reference value for the image of the high dynamic range is set as a larger value as compared with the initial value of the edge reference value for the image of the low dynamic range so that the pixel included in the block where the edge intensity is more strong can be extracted as the edge point. Also, the initial value of the extraction reference value for the image of the high dynamic range is set as a larger value as compared with the initial value of the extraction reference value for the image of the low dynamic range. The operation parameter adjustment unit 13 supplies the information representing the set edge reference value to the edge point extraction unit 15 and the extraction amount determination unit 16, and supplies the information representing the set extraction reference value to the extraction amount determination unit 16.

In step S10, similarly to the processing in step S5, the local maxes 1 to 3 are created, and the created local maxes 1 to 3 are supplied to the edge point extraction unit 15 and the edge analysis unit 17.

In step S11, similarly to the processing in step S6, the edge point tables 1 to 3 are created, and the created edge point tables 1 to 3 are supplied to the extraction amount determination unit 16.

In step S12, similarly to the processing in step S7, it is determined as to whether the edge point extraction amount is appropriate, and in a case where it is determined that the edge point extraction amount is not appropriate, the processing is advanced to step S13.

In step S13, similarly to the processing in step S8, the operation parameters are adjusted, after that, the processing is returned to step S11, and in step S12, until it is determined that the edge point extraction amount is appropriate, the processing in steps S11 to S13 is repeatedly executed.

On the other hand, in step S12, in a case where it is determined that the edge point extraction amount is appropriate, the processing is advanced to step S14.

Through the above-mentioned processing, in order to improve the detection accuracy for the blur degree, regarding the input image of the low dynamic range, the edge point is also extracted from the block where the edge intensity is weak so that the sufficient amounts of the edge points to set the detection accuracy for the blur degree of the input image equal to or higher than the certain level can be ensured, and regarding the input image of the high dynamic range, the edge point is extracted from the block where the edge intensity is strong as much as possible so that the edge point constituting the stronger edge can be extracted.

In step S14, the edge analysis unit 17 performs an edge analysis. To be more specific, the extraction amount determination unit 16 supplies the edge reference value at the moment when it is determined that the edge point extraction amount is appropriate and the edge point tables 1 to 3 to the edge analysis unit 17.

The edge analysis unit 17 selects one of the edge points extracted from the input image as the target pixel on the basis of the edge point tables 1 to 3. In a case where the coordinate of the selected target pixel is set as (x, y), the edge analysis unit 17 calculates the coordinate $(x_1, y_1)$ to the coordinate $(x_3, y_3)$ of the pixels of the local maxes 1 to 3 corresponding to the target pixel on the basis of the above-mentioned Expressions (9) to (11). The edge analysis unit 17 sets as Local $\text{Max}_1(x_1, y_1)$ the maximum value of the pixel value in the block of m×m pixels (for example, 4×4 pixels) where the pixel of the coordinate of the local max 1 $(x_1, y_1)$ is the pixel at the upper left corner, sets as Local $\text{Max}_2(x_2, y_2)$ the maximum value of the pixel value in the block of n×n pixels (for example, 2×2 pixels) where the pixel of the coordinate of the local max 2 $(x_2, y_2)$ is the pixel at the upper left corner, and sets as Local $\text{Max}_3(x_3, y_3)$ the pixel of the coordinate of the local max 3 $(x_3, y_3)$.

It should be noted that parameters in m×m used for the setting for Local $\text{Max}_1(x_1, y_1)$ and n×n used for the setting for Local $\text{Max}_2(x_2, y_2)$ are parameters for adjusting the difference in sizes of the blocks of the input image corresponding to the one pixel of the local maxes 1 to 3.

The edge analysis unit 17 determines whether or not Local $\text{Max}_1(x_1, y_1)$, Local $\text{Max}_2(x_2, y_2)$, and Local $\text{Max}_3(x_3, y_3)$ satisfy the following conditional expression (12). In a case where Local $\text{Max}_1(x_1, y_1)$, Local $\text{Max}_2(x_2, y_2)$, and Local $\text{Max}_3(x_3, y_3)$ satisfy the conditional expression (12), the edge analysis unit 17 increments a value of a variable $N_{edge}$ by one.

[Expression 4]

$$\text{Local max}_1(x_1, y_1) > \text{edge reference value}$$

or $$\text{Local max}_2(x_2, y_2) > \text{edge reference value}$$

or $$\text{Local max}_3(x_3, y_3) > \text{edge reference value} \quad (12)$$

Figure 5:
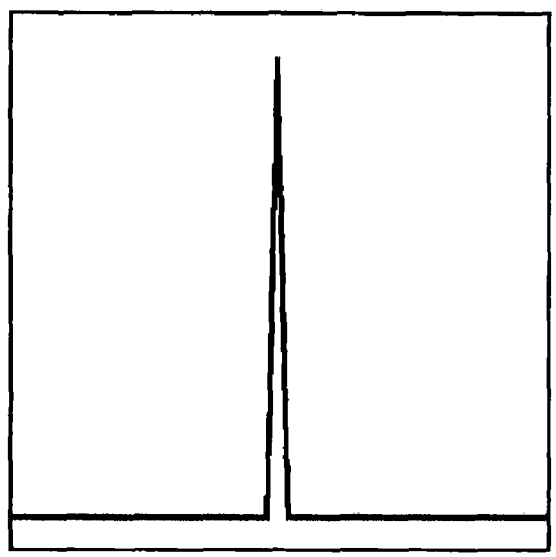
FIG. 5 illustrates an example of an edge configuration.
Figure 6:
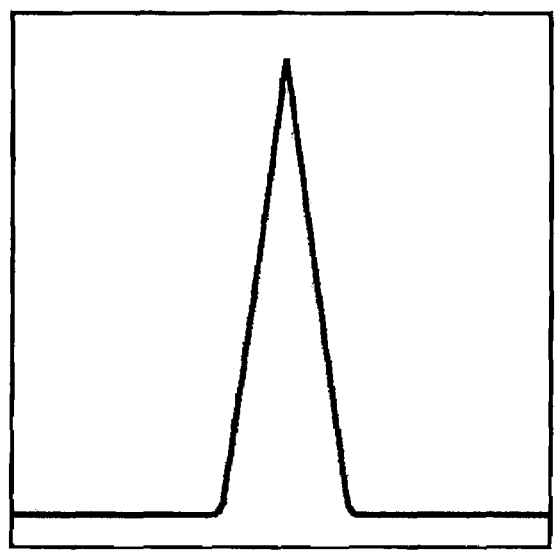
FIG. 6 illustrates another example of the edge configuration.
Figure 7:
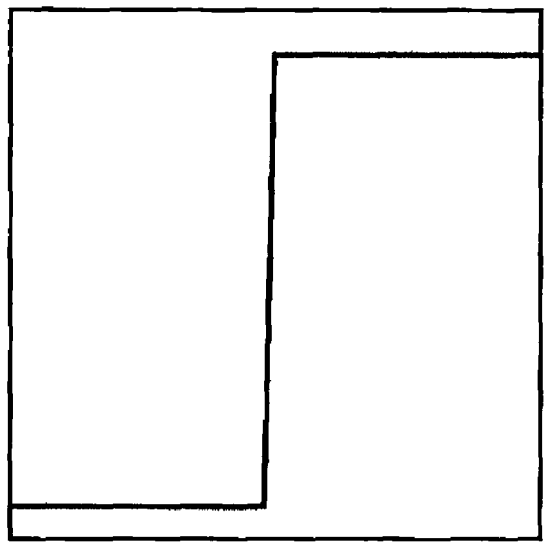
FIG. 7 illustrates still another example of the edge configuration.
Figure 8:
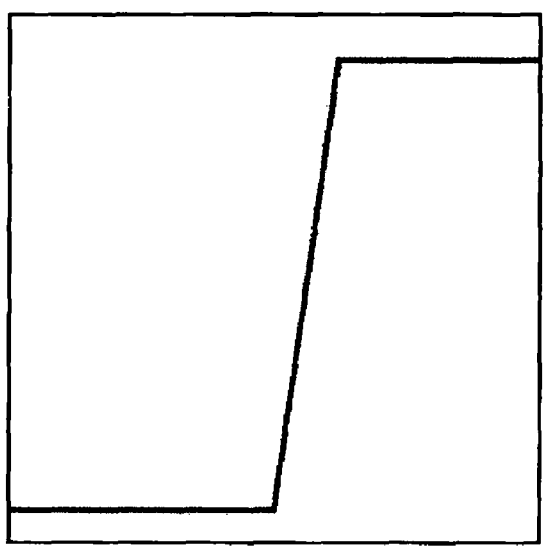
FIG. 8 illustrates still another example of the edge configuration.

It should be noted that the edge point which satisfies the conditional expression (12) is estimated to be an edge point constituting an edge having an intensity equal to or larger than a certain level irrespective of the structure, such as a steep impulse like edge shown in FIG. 5, a pulse like edge shown in FIG. 6 whose inclination is more gradual than the edge of FIG. 5, a step like edge shown in FIG. 7 whose inclination is almost vertical, and a step like edge shown in FIG. 8 whose inclination is more gradual than the edge of FIG. 7.

Also, in a case where Local Max$_1$(x$_1$, y$_1$), Local Max$_2$(x$_2$, y$_2$), and Local Max$_3$(x$_3$, y$_3$) satisfy the conditional expression (12), the edge analysis unit 17 further determines whether or not the following conditional expression (13) or the conditional expression (14) is satisfied. In a case where Local Max$_1$(x$_1$, y$_1$), Local Max$_2$(x$_2$, y$_2$), and Local MaX$_3$(x$_3$, y$_3$) satisfy the conditional expression (13) or the conditional expression (14), the edge analysis unit 17 increments a value of a variable N$_{smallblur}$ by one.

[Expression 5]

$$\text{Local max}_1(x_1, y_1) < \text{Local max}_2(x_2, y_2) < \text{Local max}_3(x_3, y_3) \quad (13)$$

$$\text{Local max}_2(x_2, y_2) > \text{Local max}_1(x_1, y_1)$$

and $$\text{Local max}_2(x_2, y_2) > \text{Local max}_3(x_3, y_3) \quad (14)$$

It should be noted that the edge point which satisfies the conditional expression (12) and also satisfies the conditional expression (13) or the conditional expression (14) is estimated to be an edge point which constitutes an edge having the structure of FIG. 6 or 8 whose intensity is equal to or larger than the certain level but whose intensity is weaker as compared with the edge of FIG. 5 or 7.

Furthermore, in a case where Local Max$_1$(x$_1$, y$_1$), Local Max$_2$(x$_2$, y$_2$), and Local Max$_3$(x$_3$, y$_3$) satisfy the conditional expression (12) and also satisfy the conditional expression (13) or the conditional expression (14), the edge analysis unit 17 determines whether or not Local Max$_1$(x$_1$, y$_1$) satisfies the following conditional expression (15). In a case where Local Max$_1$(x$_1$, y$_1$) satisfies the conditional expression (15), the edge analysis unit 17 increments a value of a variable N$_{largeblur}$ by one.

[Expression 6]

$$\text{Local max}_1(x_1, y_1) > \text{edge reference value} \quad (15)$$

It should be noted that the edge point which satisfies the conditional expression (12), satisfies the conditional expression (13) or the conditional expression (14), and also satisfies the conditional expression (15) is estimated to be an edge point which constitutes an edge in which a blur is generated and sharpness is lost among the edges having the structure of FIG. 6 or 8 whose intensity is equal to or larger than the certain level. In other words, it is estimated that the blur is generated in the edge point.

The edge analysis unit 17 repeatedly performs the above-mentioned processing until all the edge points extracted from the input image become the target pixels. With this configuration, among the extracted edge points, the number of edge points N$_{edge}$ satisfying the conditional expression (13), the number of edge points N$_{smallblur}$ satisfying the conditional expression (12) and also satisfying the conditional expression (13) or the conditional expression (14), and the number of edge points N$_{largeblur}$ satisfying the conditional expression (12), satisfying the conditional expression (13) or the conditional expression (14), and also satisfying the conditional expression (15) are calculated. The edge analysis unit 17 supplies information representing the calculated N$_{smallblur}$ and N$_{largeblur}$ to the blur degree detection unit 18.

In step S15, the blur degree detection unit 18 detects a blur degree BlurEstimation which is an index for the blur state of the input image on the basis of the following Expression (16).

[Expression 7]

$$BlurEstimation = \frac{N_{largeblur}}{N_{smallblur}} \quad (16)$$

That is, the blur degree BlurEstimation is a ratio occupied by the edge points estimated to constitute the edge in which the blur is generated among the edge points estimated to constitute the edge having the structure of FIG. 6 or 8 whose intensity is equal to or larger than the certain level. Therefore, it is estimated that as the blur degree BlurEstimation is larger, the blur state of the input image is larger, and as the blur degree BlurEstimation is smaller, the blur state of the input image is smaller.

The blur degree detection unit 18 outputs the detected blur degree BlurEstimation to the outside, and the blur degree detection processing is ended. For example, the external apparatus determines whether or not the input image is blurred by comparing the blur degree BlurEstimation with a predetermined threshold.

It should be noted that a detail of the processing in steps S14 and S15 is described in the above-mentioned "Blur Detection for Digital Images Using Wavelet Transform".

In the above-mentioned manner, in accordance with the input image, the condition for extracting the edge point and the edge point extraction amount are appropriately controlled, and it is therefore possible to detect the blur state of the input image at a higher accuracy.

Also, the edge intensity is detected without performing a complicated operation such as a wavelet transform, and it is therefore possible to shorten the period of time for detecting the edge intensity as compared with the invention disclosed in "Blur Detection for Digital Images Using Wavelet Transform".

Figure 9:
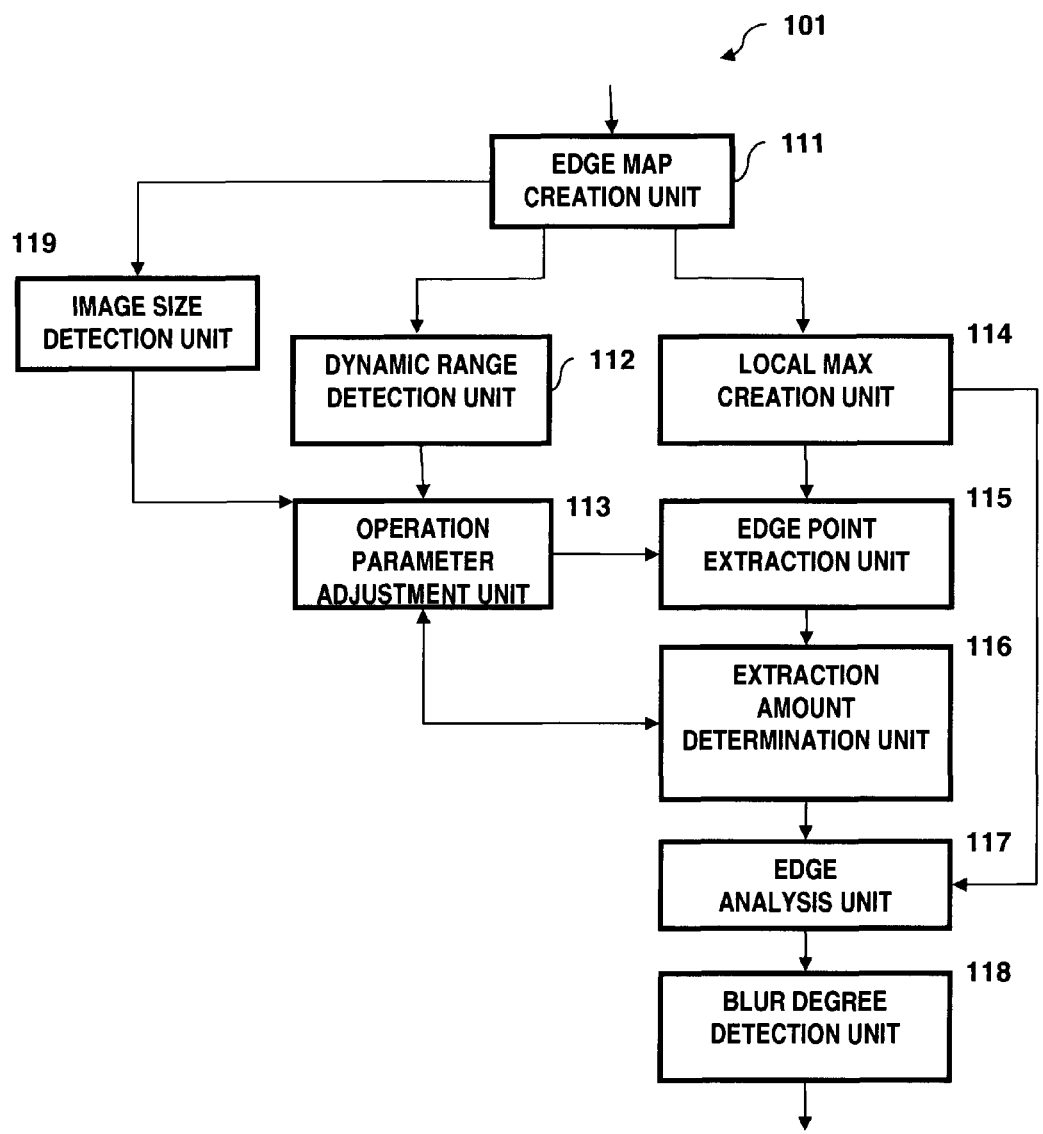
FIG. 9 is a block diagram of an image processing apparatus according to another embodiment to which the present invention is applied.
Figure 10:
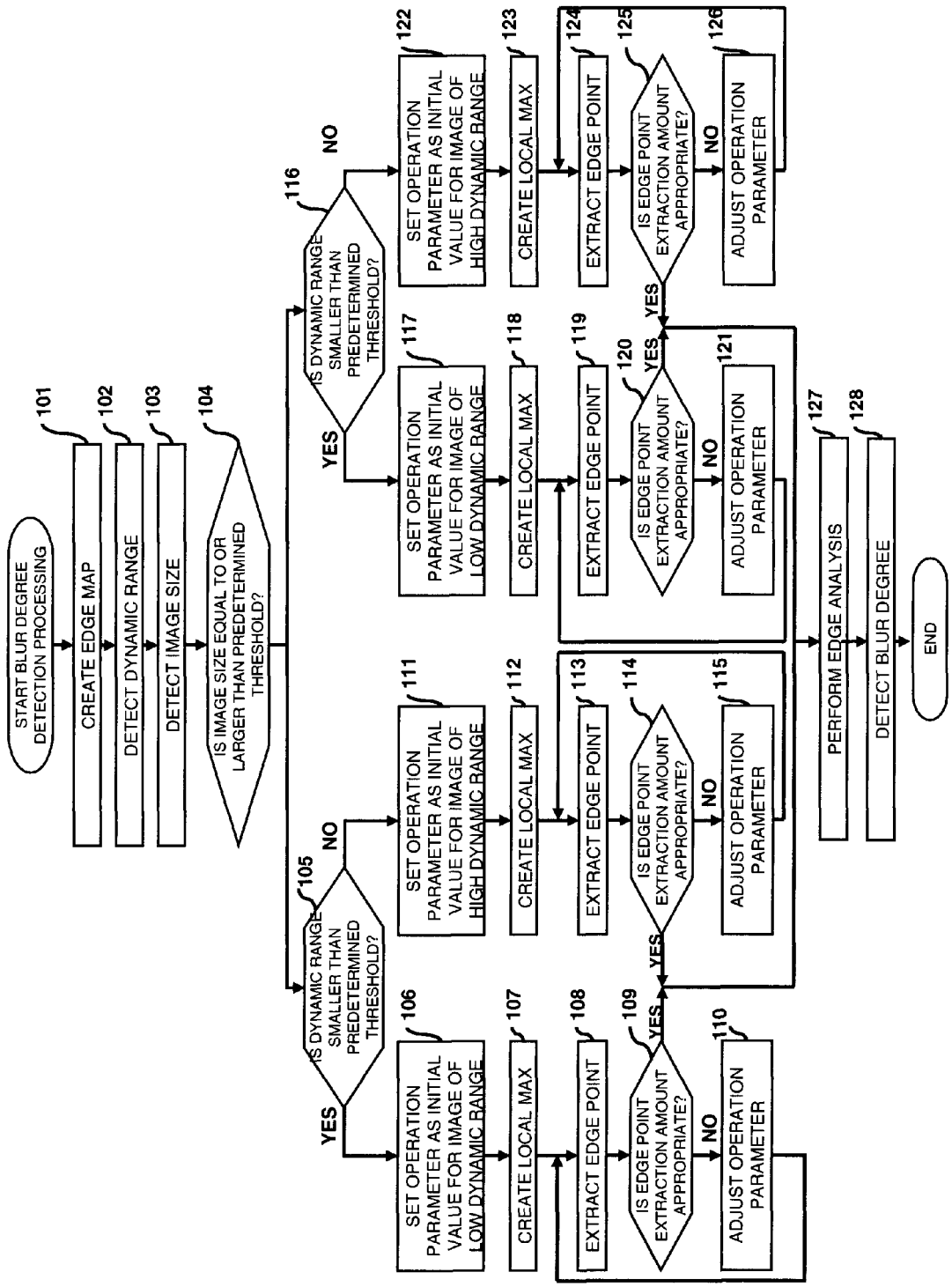
FIG. 10 is a flowchart for describing a blur degree detection processing executed by the image processing apparatus.

Next, the second embodiment of image processing apparatus according to the present invention is described with reference to FIG. 9 and FIG. 10. An image processing apparatus 101 shown in FIG. 9 is configured to include an edge map creation unit 111, a dynamic range detection unit 112, an operation parameter adjustment unit 113, a local max creation unit 114, an edge point extraction unit 115, an extraction amount determination unit 116, an edge analysis unit 117, a blur degree detection unit 118 and an image size detection unit 119. It should be noted that parts in the present figure, which correspond to ones in FIG. 1, are designated by numbers having the same last two digit values in both figures, respectively. To avoid repetition of the description, explanation is omitted for the part performing the same processing as that of FIG. 1

The size detection unit 119 detects an image size (the number of pixels) of input image, and provides the operation parameter adjustment unit 113 with information indicating a detected image size of input image.

The operation parameter adjustment unit 113 adjusts operation parameters that include an edge reference value and an extraction reference value based on the detected image size and a dynamic range of input image, as it will be explained below. The operation parameter adjustment unit 113 provides the edge point extraction unit 115 and the extraction amount determination unit 116 with information indicating an edge reference value set, and provides the extraction amount determination unit 116 with information indicating an extraction reference value set.

Next, a blur degree detection processing performed by the image processing apparatus 101 will be explained with reference to a flowchart shown in FIG. 10. Such processing starts, for example, if an input image that becomes a detection subject is input to the edge map creation unit 111 and the image size detection unit 119.

Processing performed in Steps S101 and S102 are similar to those of Steps S1 and S2. To avoid repetition, the explanation thereof is omitted. According to such processing, the edge map of the input image is created and the dynamic range of the input image is detected.

In Step S103, the image size detection unit 119 detects an image size. For example, the image size detection unit 119 detects the numbers of pixels of the image size in longitudinal and lateral directions as the image size. The image size detection unit 119 provides the operation parameter adjustment unit 113 with information indicating the detected image size.

In Step S104, the operation parameter adjustment unit 113 determines if the image size is equal to a predetermined threshold value or larger. The operation parameter adjustment unit 113 determines that the image size is not equal to the predetermined threshold value or larger if the numbers of pixels of the input image is less than the predetermined threshold value (For example, 256×256 pixels), and then the processing advances to Step S105.

Processing performed in Steps S105 to S115 is similar to that of Steps S3 to S13. To avoid repetition, the explanation thereof is omitted. According to such processing, the edge point is extracted from an input image having the image size less than the predetermined threshold value while adjusting the edge reference value and the extraction reference value. Subsequently, the processing proceeds to Step S127.

If the image size is determined as equal to or larger than the predetermined threshold value in Step S104, the processing proceeds to Step S116.

Processing performed in Steps S116 to S126 is similar to that of Steps S3 to S13. To avoid repetition, the explanation thereof is omitted. According to such processing, the edge point is extracted from an input image having the image size equal to or larger than the predetermined threshold value while adjusting the edge reference value and the extraction reference value. Subsequently, the processing proceeds to Step S127.

It should be noted that initial values of the edge reference value and the extraction reference value set in Steps S106, S111, S117 and S122 are different from each other. In other words, one pair is selected from four kinds of initial value pairs for the edge reference value and the extraction value based on the image size and dynamic range of input image.

For example, as described above, larger initial values are set for the edge reference value and the extraction reference value as the dynamic range of input image increases, and a larger initial value is set for the extraction reference value as the image size increases. Accordingly, for the same low dynamic range images, the smaller initial value is set for the extraction reference value if the image size is less than the predetermined threshold value, as compared to a case where the image size is equal to the predetermined threshold value or larger. The same applies to images with high dynamic range.

The reason for this is the following. It is estimated that, if images have the same dynamic range, an amount of edge points extracted is smaller in the smaller size image since there are less edges in the smaller image. Accordingly, it may be possible that accuracy of the edge point extraction may become less if the same number of the edge point is extracted from the smaller size image as that of the larger size image. In order to avoid such a case, if the image size is less than the predetermined threshold value, the initial value of the extraction reference value is set to a smaller value than the initial value set for a case where the image size is equal to the predetermined threshold value or larger.

Processing performed in Steps S127 and S128 are similar to those in Steps S14 and S15. To avoid repetition, the explanation thereof is omitted. According to such processing, the edge analysis of each pixel of the input image is performed, and based on results of the edge analysis, the degree of blur "BlurEstimation" of the input image is detected. Subsequently, the blur detection processing ends.

As described above, the initial values of the edge reference value and the extraction reference value are set in consideration of not only the dynamic range of input image but also its image size. Accordingly, the blur degree of an input image is detectable in high precision.

It should be noted that the above-mentioned description shows the example of calculating the mean value of the edge intensities in the three directions of upper and lower, left and right, and oblique directions in the block in a case where the edge map is created, but for example, the mean value of the edge intensities in one direction or two directions may be calculated.

Also, the above-mentioned description shows the example of performing the processing while the input image is classified into two types of the high dynamic range and the low dynamic range, but such a configuration may be adopted that classification into three or more types is performed depending on a range of the dynamic range, and as the dynamic range is larger, the initial values of the edge reference value and the extraction reference value are set as larger values, and as the dynamic range is smaller, the initial values of the edge reference value and the extraction reference value are set as smaller values. With this configuration, the blur state of the input image can be detected at a higher accuracy.

Furthermore, the above-mentioned description shows the example of setting the small edge reference value in a case where the amount of extracted edge points is too small so that more edge points are to be extracted, but furthermore, the edge reference value may be set larger in a case where the amount of extracted edge points is too large so that the amount of edge points to be extracted is decreased. That is, the edge reference value may be adjusted in a direction where the edge point extraction amount becomes an appropriate amount.

Also, for example, in a case where it is determined that this is the input image of the low dynamic range, when the amount of extracted edge points is too large, the processing may be performed while treating as the input image of the high dynamic range.

Also, the size of the block in a case where the above-mentioned edge map and the local max are created is the one example, and can also be set as a size different from the above-mentioned size.

Furthermore, in the second embodiment of the present invention, it is described an example case in which the image size of input image is classified in two types and performed processing accordingly. Alternatively, the image size may be classified into three types or more. The larger initial value may be set for the extraction reference value as the image size becomes larger, and the smaller initial value may be set for the extraction reference value as the image size becomes smaller. Accordingly, the blur of an input image may be detectable in higher precession.

In the second embodiment of the present invention, the initial value of the edge reference value may be changed in accordance with the image size of input image.

Furthermore, in the second embodiment of the present invention, the threshold value to be used in classifying the dynamic range of input image may be changed in accordance with the image size of input image.

Furthermore, in the second embodiment of the present invention, it is described an example case in which the classifying of the dynamic range of input image after classifying the image size of input image. Alternatively, these processing may be performed in the reverse order.

The above-mentioned series of processing can also be executed by hardware and can also be executed by software. In a case where the software executes the series of processing, a program constituting the software is installed from a program recording medium into a computer incorporated in dedicated use hardware or, for example, a general-use personal computer or the like which can execute various functions through installment of various programs.

Figure 11:
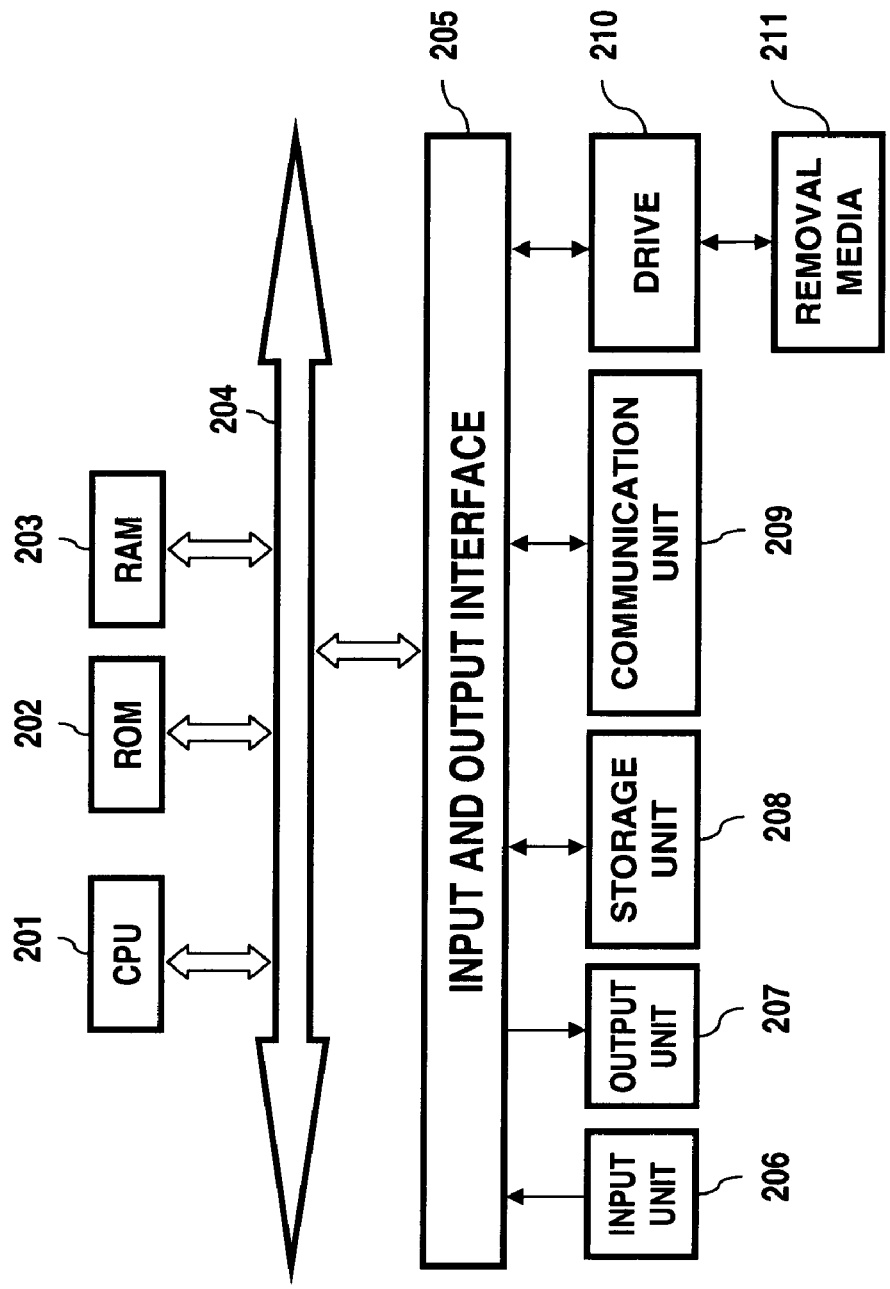
FIG. 11 illustrates a configuration example of a computer.

FIG. 11 is a block diagram of a hardware configuration example of a computer executing the above-mentioned series of processing by way of a program.

In the computer, a CPU (Central Processing Unit) 201, a ROM (Read Only Memory) 202, and a RAM (Random Access Memory) 203 are mutually connected by a bus 204.

Furthermore, an input and output interface 205 is connected to the bus 204. To the input and output interface 205, an input unit 206 composed of a keyboard, a mouse, a microphone, and the like, an output unit 207 composed of a display, a speaker, and the like, a storage unit 208 composed of a hard disc drive, a non-volatile memory, and the like, a communication unit 209 composed of a network interface and the like, and a drive 210 for driving a removal media 211 such as a magnetic disc, an optical disc, an opto-magnetic disc, or a semiconductor memory are connected.

In the computer configured in the above-mentioned manner, the CPU 201 loads and executes the program stored, for example, in the storage unit 208 onto the RAM 203 via the input and output interface 205 and the bus 204 to perform the above-mentioned series of processing.

The program executed by the computer (the CPU 201) is recorded, for example, on the removal media 211 functioning as a package media composed of the magnetic disc (including a flexible disc), the optical disc (a CD-ROM (Compact Disc-Read Only Memory), a DVD (Digital Versatile Disc) or the like), the opto-magnetic disc, or the semiconductor memory, or the like, or is provide via a wired or wireless transmission medium such as a local area network, the internet, or digital satellite broadcasting.

Then, the program can be installed via the input and output interface 205 in the storage unit 208 by mounting the removal media 211 to the drive 210. Also, the program can be installed in the storage unit 208 while being received by the communication unit 209 via the wired or wireless transmission medium. In addition, the program can be installed in the ROM 202 or the storage unit 208 in advance.

It should be noted that the program executed by the computer may be a program in which a processing is performed in a time series manner along with the order described in the present specification, or may also be a program in which a processing is performed in parallel or at a requested timing such as a call is performed.

Also, embodiments of the present invention are not limited to the above-mentioned embodiments, and it should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus configured to detect a blur state of an image, the image being divided into a plurality of blocks, the image processing apparatus comprising:
   a central processing unit (CPU);
   an intensity detection section to detect intensities of the plurality blocks of a predetermined size;
   a parameter adjustment section, performed by the CPU, to
      adjust an edge reference value for determining whether or not a block is an edge point of the image; and
      adjust an extraction reference value for determining whether or not a number of extracted blocks as edge points is appropriate; and
      set initial values of the edge reference value and the extraction reference value as larger values if a dynamic range, which is a difference between a maximum value and a minimum value of the intensities of the blocks within the image, is larger;
   an edge point extraction section, performed by the CPU, to extract a block as the edge point when the detected block intensity is equal to or larger than the edge reference value; and
   an extraction amount determination section, performed by the CPU, to determine whether or not the number of extracted blocks as edge points is appropriate by comparing the number to the extraction reference value,
   wherein the parameter adjustment section repeatedly performs a processing of adjusting the edge reference value such that the number of extracted blocks as edge points becomes appropriate when the number of extracted blocks as edge points is equal to or larger than the extraction reference value, and
   wherein the edge point extraction section repeatedly performs a processing of extracting the edge points until it is determined that the number of extracted blocks as edge points is appropriate.

2. The image processing apparatus according to claim 1, wherein each of the blocks comprises a plurality of pixels; and
the intensity detection section detects the intensity of the blocks on the basis of different pixel values among the pixels in each of the blocks.

3. The image processing apparatus according to claim 2, wherein the plurality of blocks has different sizes, and
wherein the edge point extraction section extracts one of the pixels included in at least one of the blocks and selects the pixel intensity of the extracted pixel as the intensity of the one of the blocks.

4. The image processing apparatus according to claim 3, wherein the intensity detection section:
   detects the edge intensity of the image in units of a block of a first size,
   further detects the edge intensity of the image in units of a block of a second size which is different from the first size, by detecting an edge intensity of a first averaged image which is composed of a mean value of the pixels in the respective blocks obtained by dividing the image into the blocks of the first size in units of the block of the first size, and
   further detects the edge intensity of the image in units of a block of a third size which is different from the first size and the second size, by detecting an edge intensity of a second averaged image which is composed of a mean value of the pixels in the respective blocks obtained by dividing the second averaged image into the blocks of the second size in units of the block of the second size.

5. An image processing method for an image processing apparatus configured to detect a blur state of an image, the image being divided into a plurality of blocks, the image processing method comprising the steps of:
- detecting intensities of the blocks of a predetermined size;
- setting initial values of an edge reference value used for a determination as to whether or not a block is an edge point of the image, and an extraction reference value used for a determination as to whether or not a number of extracted blocks as edge points is appropriate as larger values if a dynamic range, which is a difference between a maximum value and a minimum value of the intensities of the blocks within the image, is larger;
- extracting a block as the edge point when the detected intensity of the block is equal to or larger than the edge reference value;
- determining whether or not a number of extracted blocks as edge points is appropriate by comparing the number to the extraction reference value;
- adjusting the edge reference value when the number of extracted blocks as edge points is not appropriate; and
- repeating the extracting step on the basis of the adjusted edge reference value until the number of extracted blocks as edge points is determined as appropriate.

6. A non-transitory computer-readable medium storing a program instructing a computer to execute a processing to detect a blur state of an image, the image being divided into a plurality of blocks, the program instructing the computer to execute a processing comprising the steps of:
- detecting intensities of the blocks of a predetermined size;
- setting initial values of an edge reference value used for a determination as to whether or not a block is an edge point of the image, and an extraction reference value used for a determination as to whether or not a number of extracted blocks as edge points is appropriate as larger values if a dynamic range, which is a difference between a maximum value and a minimum value of the intensities of the blocks within the image, is larger;
- extracting a block as the edge point when the detected intensity of the block is equal to or larger than the edge reference value;
- determining whether or not a number of extracted blocks as edge points is appropriate by comparing the number to the extraction reference value;
- adjusting the edge reference value when the number of extracted blocks as edge points is not appropriate; and
- repeating the extracting step on the basis of the adjusted edge reference value until the number of extracted blocks as edge points is determined as appropriate.

7. An image processing apparatus configured to detect a blur state of an image, the image being divided into a plurality of blocks, the image processing apparatus comprising:
- an edge intensity detection unit adapted to detect intensities of the plurality blocks of a predetermined size;
- a parameter adjustment unit adapted to
  - adjust an edge reference value for determining whether or not a block is an edge point of the image; and
  - adjust an extraction reference value for determining whether or not a number of extracted blocks as edge points is appropriate; and
  - set initial values of the edge reference value and the extraction reference value as larger values if a dynamic range, which is a difference between a maximum value and a minimum value of the intensities of the blocks within the image, is larger;
- an edge point extraction unit adapted to extract a block as the edge point when the detected block intensity is equal to or larger than the edge reference value; and
- an extraction amount determination unit adapted to determine whether or not the number of extracted blocks as edge points is appropriate by comparing the number to the extraction reference value,
- wherein the parameter adjustment unit repeatedly performs a processing of adjusting the edge reference value such that the number of extracted blocks as edge points becomes appropriate when the number of extracted blocks as edge points is equal to or larger than the extraction reference value, and
- wherein the edge point extraction unit repeatedly performs a processing of extracting the edge points until it is determined that the number of extracted blocks as edge points is appropriate.

8. The image processing apparatus according to claim 1, further comprising a dynamic-range detection section, performed by the CPU, configured to determine a dynamic range of the image,
- wherein the parameter adjustment section is configured to:
  - compare the dynamic range of the image with a predetermined dynamic-range threshold value; and
  - set the initial values of the edge reference value and the extraction reference value based on a result of the dynamic-range comparison.

9. The image processing apparatus according to claim 1, further comprising a image-size detection section configured to detect a size of the image,
- wherein the parameter adjustment section is configured to:
  - compare the size of the image with a predetermined image-size threshold value; and
  - set the initial values of the edge reference value and the extraction reference value based on a result of the image-size comparison.

10. The image processing apparatus according to claim 9, wherein:
- the parameter adjustment section is configured to set initial values of the edge reference value and the extraction reference value as first values when the size of the image is equal to or greater than the predetermined image-size threshold value; and
- the parameter adjustment section is configured to set initial values of the edge reference value and the extraction reference value as second values when the size of the image is less than the predetermined image-size threshold value,
- the first values being greater than the second values.

* * * * *